United States Patent [19]
Blanchet et al.

[11] Patent Number: 4,752,110
[45] Date of Patent: Jun. 21, 1988

[54] CABINET FOR AN OPTICAL CABLE HEAD

[75] Inventors: Pierre Blanchet, Villeneuve le Roi; Christian Renaudin, Les Ulis, both of France

[73] Assignee: Alcatel, Paris, France

[21] Appl. No.: 931,778

[22] Filed: Nov. 18, 1986

[30] Foreign Application Priority Data

Nov. 18, 1985 [FR] France ............................ 85 16993

[51] Int. Cl.$^4$ .............................................. G02B 6/42
[52] U.S. Cl. ................................ 350/96.20; 350/96.23
[58] Field of Search ............... 312/223, 245, 286, 320; 350/96.20, 96.23, 96.24

[56] References Cited

U.S. PATENT DOCUMENTS 4,717,231 1/1988 Dewez et al. ...................... 350/96.2

FOREIGN PATENT DOCUMENTS 0149250 8/1985 European Pat. Off. .
0186579 7/1986 European Pat. Off. .
3116869 11/1982 Fed. Rep. of Germany .
2515466 4/1983 France .
2559277 8/1985 France .

Primary Examiner—Eugene R. LaRoche
Assistant Examiner—Steven J. Mottola
Attorney, Agent, or Firm—Sughrue, Mion, Zinn, Macpeak, and Seas

[57] ABSTRACT

The cabinet comprises a rear portion (1) fixed on the risers (15) of a rack, and a front portion (2) which is hinged to the rear portion. The rear portion (1) is fitted with means (27, 30-31, 28) for processing the component parts of a cable received by a cabinet to enable the component parts to be distributed out from the cabinet or else to be distributed in the form of individual fibers to the front portion of the cabinet, which front portion includes optical centering devices (60) for providing connections between the fibers received from the rear portion of the cabinet and link elements for providing links to opto-electronic equipment. Said optical centering devices are mounted in the front portion in such a manner as to ensure that they transmit light flux parallel to its front face. The cabinet is applicable to telecommunications stations.

11 Claims, 3 Drawing Sheets

CABINET FOR AN OPTICAL CABLE HEAD

The present invention relates to optical fiber transmission systems, and in particular to the cabinets in such systems in the individual fibers of an optical cable are processed for connection to opto-electronic equipment.

BACKGROUND OF THE INVENTION

On arrival in a telecommunications station, each optical fiber line cable is directed along cable paths to a rack where it is to be processed. The cable is splayed out at the inlet to a device disposed in the rack and called an optical cable head. In such a cable head, each fiber of the cable is treated individually and is directed via two half-connectors to corresponding opto-electronic equipment. The fibers in the cable are connected to inlets or to outlets of the opto-electronic equipment, as necessary.

The optical cable head device is generally in the form of a simple plate mounted at the top of the rack. The plate carries supports for optical connectors for interconnecting two optical half-connectors, and referred to as centering devices. The centering devices run through the plate transversely and are suitable for receiving the said half-connectors from opposite faces of the plate.

In order to provide a distribution function for the optical fibers of a line cable and for the opto-electronic equipment of a rack using the cable head device, the line cable is splayed out into individual fibers at the cable head device. After ensuring that a spare length of fiber is provided in case subsequent repair is necessary, each individual fiber is terminated with a respective half-connector. Each of these half-connectors is received in one of the centering devices of the plate so that it projects from the rear face of the plate. Optical connection jumpers each provided with a half-connector at each end are used for making connections between the cable optical fibers and the opto-electronic equipment. One of the half-connectors of each jumper is received in one of the centering devices so that it projects from the front face of the plate, and the jumper's other half-connector is received in a connection centering device on the equipment concerned.

This method of providing distribution between the optical fibers of a line cable and opto-electronic equipment suffers from numerous drawbacks. The following drawbacks may be mentioned:

the spare lengths of optical fiber are stored in a disorderly manner in the rack;
 the jumpers project forwardly from the front face of the rack, and because of the minimum radius of curvature which must be observed, they tend to get in the way during subsequent operations, in particular when two racks are mounted facing each other;
 it is difficult to distribute and repair the fibers behind the plate which is mounted in fixed manner on the rack;
 there is the danger of accidents to the eyes of technicians manipulating jumpers by virtue of the light conveyed by the fibers connected to the centering devices on the plate propagating perpendicularly relative to the plate, and in particular from the front face thereof; and
 no means are provided for modifying the installation as the capacity of a transmission system grows and with the corresponding growth in the capacity of the line cables it serves; this is because such modifications generally require opto-electronic equipment to be located in several different racks and for the line cable fibers to be distributed in corresponding manner to said different racks, thus requiring splices between fibers having different destination or origin racks.

An aim of the present invention is to provide a cable head device in the form of a cabinet which mitigates the above drawbacks.

SUMMARY OF THE INVENTION

The present invention provides an optical cable head cabinet of substantially rectangular shape fitted with at leat one cable access at which cable received thereby is splayed out into component optical parts, the cabinet including a plurality of optical connector elements for making connections between individual fibers from a splayed out cable and optical link elements for providing links to external opto-electronic equipment, together with means for coiling at least those fibers which are to be connected, the cabinet comprising rear portion and front portion which is hinged to said rear portion, with the inside volumes of said front and rear portions being in communication with each other, said front portion carrying said optical connector elements mounted in at least one row extending vertically along the height of the cabinet for providing individual optical flux transmission parallel to the front face of the cabinet, and said rear portion being equipped with means for distributing said component parts from each cable either out from the cabinet or else towards said front portion in the form of individual fibers for connection to said link elements via said connector elements.

In addition, a cabinet in accordance with the invention includes a plurality of supports for storing spare lengths of fiber in said front portion and associated with the individual fibers received by said optical connector elements.

Said optical connector elements and said supports storing spare lengths of fiber are distributed along at least one supporting strip extending between the top and bottom faces of the front portion and lying in the vicinity of the plane of said front face.

The front portion may have a slot at the front of at least one of its side faces for passing said optical link elements. Advantageously, said front portion is constituted by two identical compartments hinged to respective side edges of the rear portion.

The cabinet may also have two channel section side members fixed to the side walls of said rear portion and serving to fix the cabinet to the risers of a rack, thereby fixing said rear portion and simultaneously defining side channels for passing optical cables.

BRIEF DESCRIPTION OF THE DRAWINGS

An embodiment of the invention is described by way of example with reference to the accompanying drawings, in which.

MORE DETAILED DESCRIPTION

Figure 1:
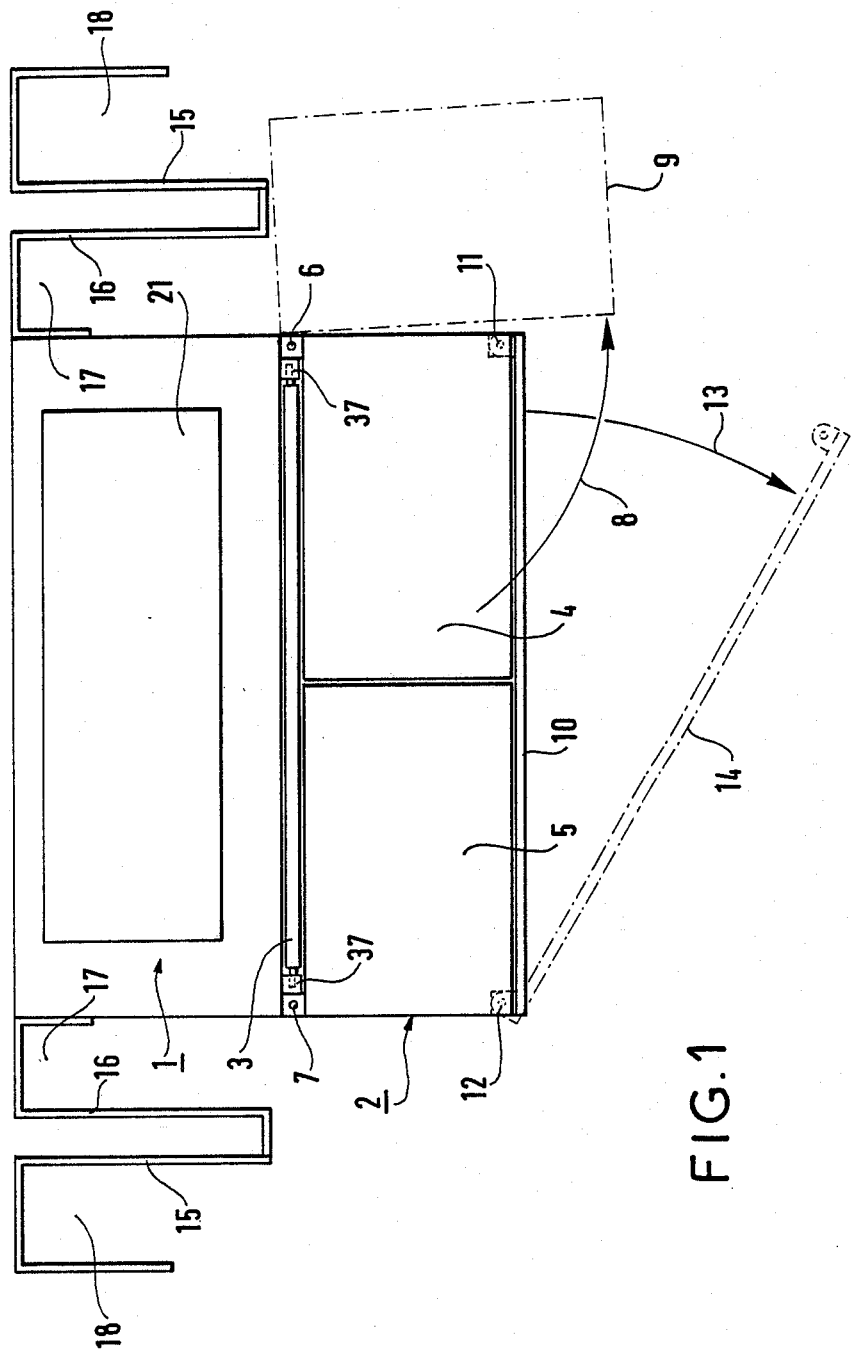
FIG. 1 is a plan view of a cabinet in accordance with the invention mounted on a rack and as seen from above.

With reference to FIG. 1, it can be seen that a cabinet is generally rectangular in shape. Depthwise, it is separated into two portions, namely a rear portion 1 and a front portion 2. The internal face of each of these portions is open, i.e. the front face of the rear portion 1 is open as is the rear face of the front portion 2. A fold-up flap 3 is disposed between the front and rear portions 1 and 2.

The front portion 2 is itself constituted by two identical compartments 4 and 5. The compartments 4 and 5 are independent from each other and each occupies the full height of the cabinet and substantially one-half of its width. Each of these compartments is hinged to the rear portion 1 along its side edge which meets the front face of the rear portion and the hinge axes are shown diagrammatically at 6 and 7, respectively. The front portion 2 can thus be opened as a pair of doors with arrow 8 showing the motion of the compartment 4 towards an open position which is shown at 9 in dot-dashed lines.

The cabinet is closed by a protective plate 10 disposed over the front face of its front portion 2. This protective plate 10 is hinged to the side edge of the front face of the front portion 2, as shown diagrammatically at 11 or 12, depending on the side considered. The protective plate can thus be opened to one side or to the other, as shown by arrow 13 representing its motion towards one of two possible open positions. Dot-dashed lines are used to show the protective plate in half-open position at 14. The protective plate may also be removed completely.

From FIG. 1, it can also be seen that the rear portion is the fixed portion of the cabinet and is used for fixing the cabinet to risers 15 of a rack. Fixing is provided by means of side members 16 fixed to each of the side walls of the rear portion. Each side member 16 is in the form of a generally channel-section bar with one of the flanges of the bar extending further than the other and with the end of the longer flange being folded outwardly at 90° to form a narrow rim.

The shorter flange of each side member 16 is welded to the corresponding side wall of the cabinet with the channel section web of each side member lying in substantially the same plane as the rear face of the rear portion 1. The outwardly directed rims on the longer flanges of the side members are fixed to corresponding risers 15 of the rack. In conjunction with the side face of the rear portion to which it is fixed, each side member 16 delimits a channel 17 for passing optical line cables. Each riser 15 is also constituted by a generally channel-section bar and defines a further channel 18 which may be used for passing optical components for providing links between the fibers in the cables and opto-electronic equipment mounted on the rack.

Figure 2:
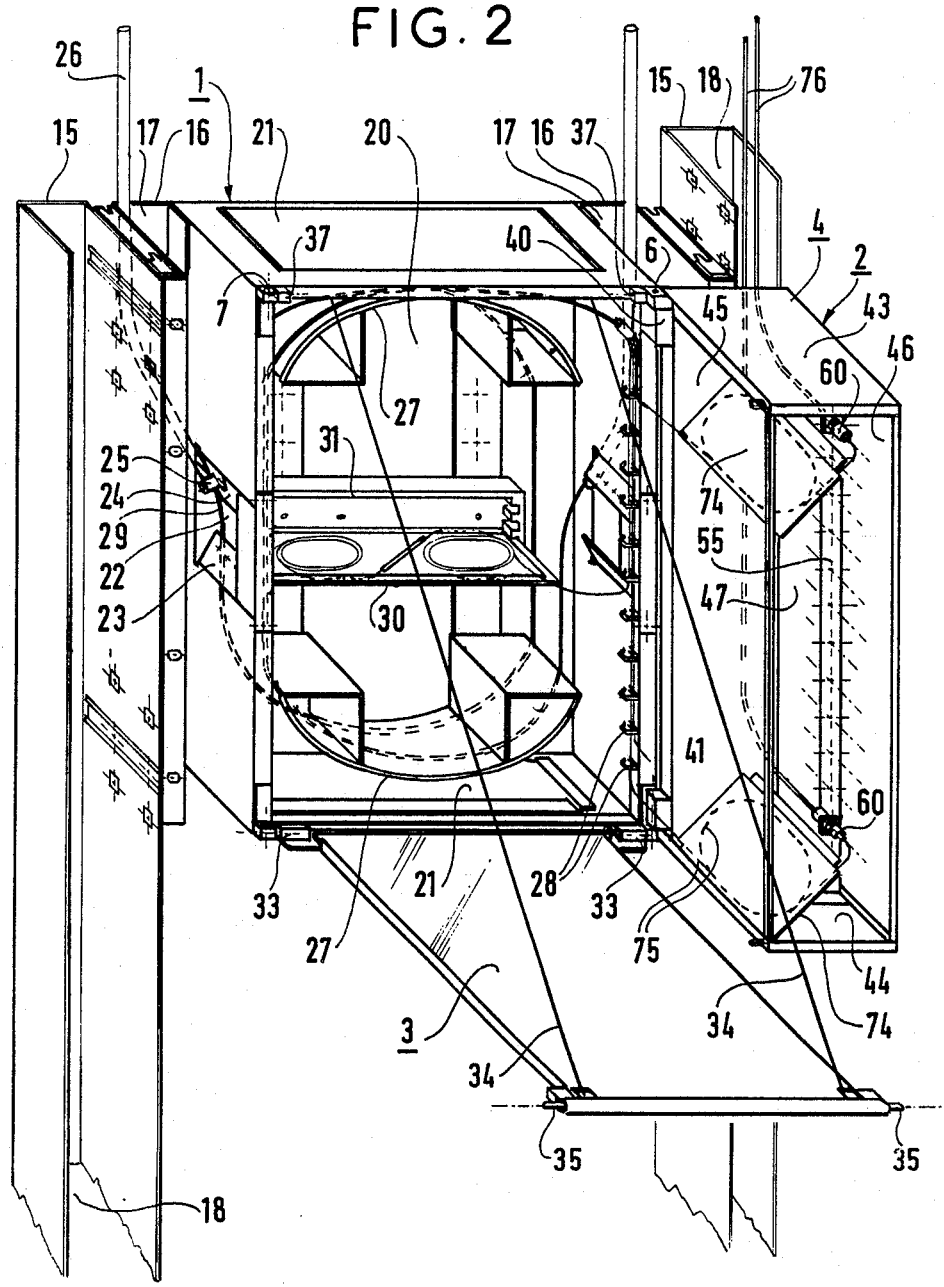
FIG. 2 is a diagrammatic perspective view of a FIG. 1 cabinet shown still mounted on a rack, but with some of its components removed.

FIG. 2 shows the cabinet in its open position, with the front protective plate and the left-hand compartment of the front portion being removed in order to reveal the internal structure of the cabinet. Component parts of the cabinet shown both FIGS. 2 and 1 bear the same reference numerals in FIG. 2 as in FIG. 1.

In FIG. 2, it can be seen that the rear portion 1 is constituted by five plates having peripheral rims and which are spot welded to one another. The front rims of the two side plates and of the top and bottom plates delimit the open front face 20 of the rear portion 1. An unreferenced rectangular opening is provided in each of the top and bottom plates and is closed by a corresponding removable cover 21. These covers are advantageously constituted by a simple plate which is held in place in a slideway formed by suitably embossing the sides of the opening. Substantially in the middle of the two side walls of the rear portion of the cabinet there is an opening 22 defined between a respective pair rectangular tongues 23 and 24 formed by punching. These tongues are inclined symmetrically relative to each other and slope inwardly towards the inside of the rear portion 1. These pairs of tongues 23 and 24 serve to support collars 25 for passing individual sheathed fibers and/or cable cores obtained by splaying out optical line cables such as 26 to separate them into their component optical parts 29. The line cables are laid along the side channels 17 and extend as far as the corresponding openings 22 from the top or the bottom of the rack.

The peripheral portion of the inside volume of the rear portion 1 is used for coiling the component parts 29 of the line cables in the form individual sheathed fibers or in the form of cable cores, in order to provide reserve lengths of fiber and/or core.

A coiling path is defined by a pair of arches 27 fixed to the rear plate, with one of the arches having its convex surface facing towards the top plate and the other having its convex surface facing towards the bottom plate. In each case a relatively narrow gap is left between the convex surface and the facing plate, and the ends of the arch extend to the vicinity of the side plates.

A row of hooks or fasteners 28 is provided along each of the two side walls in the vicinity of the open front face 20 in order to guide the individual fibers constituting component parts 29 of the cable or taken from the cores constituting said component parts 29 as they leave the coiling path, thereby enabling the fibers to be distributed in an orderly manner inside the cabinet.

The central portion of the inside volume between the two arches is reserved for individual or collective splicing boxes 30 which are mounted on a support 31 fixed to the rear plate. The individual boxes may be in the form, for example, of individual flat "cassettes" which are slidably received in cassette-receiving grooves provided in the support. The cassettes receive fibers to be interconnected from two cables, with the fibers concerning a cassette being diverted from the guide paths formed by the rows of fasteners 28 by the fasteners which correspond substantially to the cassette in question.

A flap 3 is mounted at the front of the rear portion 1 in such a manner as to be capable of being folded down to constitute a table or work surface when doing minor work in a cabinet. The flap is hinged to the ends of the bottom front edge of the rear portion 1 at hinges 33. It is held in a horizontal position by two flexible cords 34 which are connected between the top front edge of the rear portion 1 and the corresponding end of the flap. The flap substantially closes the rear portion of the cabinet and may be locked to the top front edge thereof by two retractable bolts 35 mounted on the flap and engageable in locking supports 37 provided at the side ends of the top front edge of the rear portion 1. The width of the flap is slightly less than the width of rear portion; when in its closed position the flap therefore leaves two side openings between itself and the front side edges of the rear portion, each of said openings running adjacent to one of the two rows of fasteners 28. The fasteners 28 can thus be used to distribute fibers in an orderly manner through said openings between the front and rear portions of the cabinet.

FIG. 2 also shows the right-hand compartment 4 of the front portion in its open position. The other compartment has been removed, but it is identical to the compartment shown. Each of these compartments pivots about two hinges such as 40 and 41 (for the compartment 4) mounted between respective front side edges of the rear portion 1 and corresponding rear side edges of the two compartments of the front portion 2. The hinges 40 and 41 define the hinge axis 6 shown diagrammatically in FIG. 1. When both compartments are opened and the flap 3 has been lowered to its working position, the front face of the rear portion 1 is completely uncovered and is thus accessible.

Figure 3:
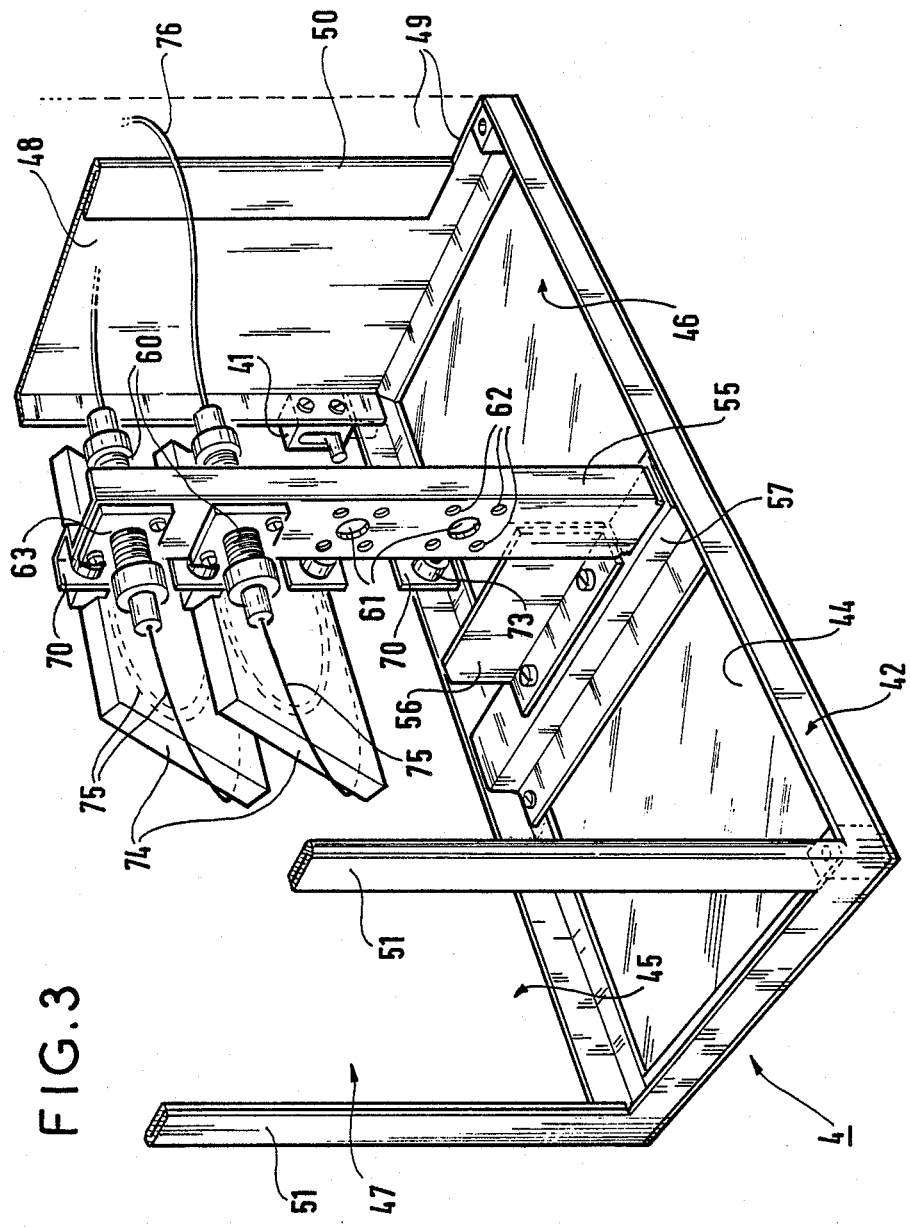
FIG. 3 is a fragmentary perspective view on a larger scale of one of the components of the cabinet.

The description of the compartment 4 is given with reference not only to FIG. 2 but also to FIG. 3.

The compartment 4 occupies the full height of the cabinet and slightly less than half its width. Its top and bottom faces 43 and 44 are closed and each of them is constituted by a plate mounted on a frame 42 built up from angle bars. Its rear face 45 which comes up against the flap 3 when the cabinet is closed and its opposite front face 46 are both open. Its inner side face 47 extending forwardly from the middle of the flap 3 when the cabinet is closed is likewise open. Its outer side face 48 opposite to face 47 is almost completely closed but leaves a slot 49 running along the full height of the front thereof. The plate which constitutes the closed portion of the side face 48 has its front vertical margin 50 folded back into the inside of the compartment along the slot 49 formed by the fold, and the rear vertical edge of the plate 48 is folded inwardly at right angles. Two risers 51 form edges between the inside side face and the front and rear faces respectively; these risers delimit the open faces of the compartment and provide it with rigidity.

The compartment 4 includes a vertical connector strip 55 mounted between the inwardly folded front edges of its top and bottom faces, and running substantially along the middle axis of the front face 46. This connector strip is of channel section and the web of the channel section faces one of the side faces of the compartments, in this case it faces the inside side face 48. The strip is set slightly back from the front face 46 towards the inside of the compartment.

At each end of the strip 55 there is a lug 56 fixed to the innermost flange of the channel section in the compartment and it has screws for fixing the strip to the corresponding top or bottom face. Two bars 57 run respectively along said top face a said bottom between the front and rear edges of the frame 42 and co-operate with the lugs 56 to provide secure fastening for the strip 55.

With specific reference to FIG. 3, it can be seen that the strip 55 in the compartment 4 constitutes a location for supporting a vertical row of conventional optical centering devices such as 60. To this end, the strip 55 has a row of holes 61 which are regularly spaced substantially along its full height. The holes 61 are formed through the web of the channel section and each hole is intended to receive a corresponding centering device. Small holes 62 are provided through the web around the periphery of each centering device hole in order to enable the centering devices to be adequately mounted. These small holes may act as keying means and they may also act to receive screws or the like.

The individual centering devices 60 are mounted horizontally on the strip so that the two connection ends on each of them extend horizontally on either side of the web of the channel section. Each centering device includes an intermediate collar 63 which presses against the channel section web and enables the centering device to be mounted in a corresponding hole 61. The collar also serves to fix the centering device by receiving the screws which pass through said small holes 62 through the strip 55.

In addition, the strip 55 includes a row of fingers 70 fixed to the channel section flange which is furthest inside the compartment. These fingers 70 are individually associated with different fibers received from the rear portion 1 and which are to be connected to the optical centering devices 60. Like the centering devices, the fingers are distributed along the full height of the strip and at the same pitch as the centering devices. Each of them serves to support a certain spare length of fiber suitable for connection in the optical centering device located at substantially the same height.

Each finger 70 is generally L-shaped. The end of one of the branches of the L is attached to the end of the corrsponding flange of the channel section. The other branch of the L is folded back towards the web of the channel section and has a fastening 73 fixed thereto for connection to a support 74 for storing said spare length of individual fiber 75. The support is held by a retaining member (no reference) which is engaged and locked in said fastening.

Advantageously, the supports 74 mounted on the various fingers are at a small angle to the horizontal in order to facilitate grasping and removing each of them. The supports may be flexible or rigid.

It will readily be understood with reference to FIG. 2 (even though this figure only shows one of the two compartments of the front portion), that the complete cabinet has two rows of optical centering devices 60 and two rows supports 74 for storing the associated spare lengths of individual optical fibers. The inwardly directed connection end fitting of the centering devices in each row receive complementary connection end fittings of known type located on the ends of the individual fibers 75 which are received in the rear portion and which have a degree of spare length stored in the various storage supports corresponding to the centering devices. The outwardly directed connection end fittings of the respective centering devices receive complementary terminal end fittings of optical jumpers 76 of known type.

These jumpers 76 provide connections between the various individual fibers and the opto-electronic equipment of the rack (not shown) via the centering devices for transmission in one or other of the two possible directions of transmission. They leave the compartment in which they are connected to the centering devices via the slot 49 at the front of the outer side face of that compartment. They turn proceed along the channel 18 of the corresponding riser 15 of the rack to said optoelectronic equipment to which they are connected.

Depending on the direction of optical signal transmission, i.e. to or from the opto-electrical equipment, the individual fibers in the front portion of the cabinet are either light-emitting or light-receiving fibers. In this front portion of the cabinet, one of the two rows of centering devices may be used for light-emitting fibers and the other for light-receiving fibers.

In operation, a cabinet in accordance with the invention is located in a rack which also receives suitable opto-electronic equipment. Given the present standardized height of such racks, up to six such cabinets may be mounted in a single rack and their line cable passing channels 17 abut along at least a portion of the rack.

The centering devices in each cable head cabinet disposed parallel to the front face of the compartments in which they are mounted transmit the light flux which they receive from the fibers or the jumpers with little risk of striking the eye of the operator. This disposition also minimizes such risks when they themselves are being operated on.

A cabinet in accordance with the invention may be used with individual sheathed fibers and/or with cores from inlet and outlet line cables connected thereto. After a cable has been splayed out into its individual sheathed fibers (or into its individual cores), the splayed out component parts are separated depending on whether they are to be processed in the same cabinet, or in another cabinet in the same rack, or in a cabinet in another rack.

The fibers (or cores) processed in the same cabinet have several meters of their length coiled together in the rear portion of the cabinet between its two arches, and thereafter the fibers are distributed by the side fastenings at suitable levels to the various centering devices via the individual coil supports for said fibers (with any cores that may be coiled round the arches being splayed out into individual sheathed (or re-sheathed) fibers for the purpose). These individual fibers with their respective connection end fittings are connected to corresponding respective centering devices.

The fibers (or cores) which are not processed in the same cabinet but which are processed in other cabinets in the same rack are directly conveyed to said other cabinets without being coiled in the rear portion of the first cabinet. The openings in the bottom and top plates of the cabinets have their cover plates 21 removed, there appropriate, to pass these fibers into the cabinet in which they are to be processed.

The fibers (or cores) which are not processed in the line cable receiving cabinet and which are processed in a cabinet in a different rack are coiled together in the rear portion of the cabinet which receives the cable and are then connected in its splice boxes to a corresponding number of fibers (cores) coming from the same coiling path and belonging to a new cable running from said line cable receiving cabinet. The new cable runs along the channels 1 of the cabinets concerned and is treated as a line cable by the cabinet which is to process its fibers. The initial line cable receiving cabinet thus acts as a relay point for said fibers by virtue of its splice boxes.

In a telecommunications station, such optical cable head cabinets are mounted one or more to a frame in the station and serve:

to distribute signals to or from the opto-electronic equipment of the same rack by means of its jumpers;

to distribute optical fibers or cores between different cabinets on the same rack; and/or to distribute optical fibers or cores between cabinets in different racks.

The spare lengths of optical fiber provided in the rear portion of a cabinet and in the front portion thereof make it possible to act on all, or at least some, of the fibers from a line cable in order to change an existing distribution network or make repairs, if necessary.

The present invention has been described with reference to a specific embodiment given by way of example and shown in the drawings. Naturally, detail modifications may be made thereto, and/or various means may be replaced by other equivalent means without going beyond the scope of the invention. In particular, the centering devices and their end fittings on either side of the connection strips may be replaced in order to reduce loss by other optical connection means for providing connections between individual fibers and jumpers, for example by individual splice boxes fitted to the connection strips.

Also, it is clear that if a specified amount of additional loss happens to be required on a particular link, such extra loss may be obtained by using an attenuating half-connector for one of the two connection end fittings for insertion in the centering device used for this particular link.

It may also be observed that a fiber connected by a centering device to a jumper may be directed to a splice box in the rear portion of the cabinet for onward connection to a different cabinet.

We claim:

1. An optical cable head cabinet of substantially rectangular shape having a first face and being fitted with at least one cable access at which a cable received thereby is splayed out into component optical parts, the cabinet including interiorly, a plurality of optical connector elements for making connections between individual fibers from a splayed out cable and optical link elements for providing links to external opto-electronic equipment, together with means for coiling at least those fibers which are to be connected, the cabinet comprising a rear portion and front portion which is hinged to said rear portion, openings within confronting faces of said cabinet rear and front portions such that said front and rear portions having inside volumes in communication with each other, said front portion carrying said optical connector elements mounted in at least one row extending vertically over the height of the cabinet for providing individual optical flux transmission parallel to the front face of the cabinet, and said rear portion being equipped with means for distributing said component parts from each cable in the form of individual fibers for connection to said link elements via said connector elements.

2. A cabinet according to claim 1, wherein said coiling means comprise a plurality of supports for storing spare lengths of fiber, said supports being mounted in said front portion and being associated with individual fibers received by said optical connector elements.

3. A cabinet according to claim 2, wherein said optical connector elements and said supports for storing spare lengths of fiber are mounted on at least one supporting strip extending substantially over the full height of the cabinet close to the plane of the cabinet front face within said cabinet front portion.

4. A cabinet according to claim 3, wherein said strip is constituted by a generally channel section bar having flanges parallel to the cabinet front face of said cabinet front portion and a web joining said flanges, and wherein said optical connector elements are mounted through the web thereof and are constituted by optical centering devices having two connection end fittings mounted on either side of the web of the strip.

5. A cabinet according to claim 4, wherein said strip further includes a row of fingers on the innermost of said flanges of the channel section strip, and fingers being at levels which correspond substantially to the various centering devices on the strip and serving as fastening points for said supports for spare lengths of individual fibers.

6. A cabinet according to claim 5, wherein said cabinet front portion has opposed side faces and a slot running along the front of at least one of its side faces to provide a passage for said optical link elements.

7. A cabinet according to claim 1, wherein said cabinet front portion is constituted by two compartments which are identical to each other, with each compartment occupying substantially one-half the width of the cabinet and with each compartment being hinged to one side of the rear portion, respectively.

8. A cabinet according to claim 1, further including a fold-up flap between said cabinet front portions and said cabinet rear portion, means mounting said flap for folding between a horizontal position and a vertical position in which it closes the front face of the rear portion leaving two side openings for communication between said cabinet front and rear portions.

9. A cabinet according to claim 1, wherein said cabinet rear portion includes means for coiling a set of component parts of each cable substantially around the periphery of said cabinet rear portion internal volume.

10. A cabinet according to claim 9, wherein said cabinet rear portion has a rear face and includes splice boxes mounted in the middle of said cabinet rear portion inside volume on a support which is fixed to the rear face of said rear portion.

11. A cabinet according to claim 1, wherein said cabinet rear portion has a rear face and the outside of the side faces of said cabinet rear portion carry respective generally channel-section side members having webs substantially in the same plane as the rear face of the cabinet rear portion and serving to fix the cabinet on two risers of a rack, and each side member has a channel providing a passage for optical cables.

* * * * *